United States Patent [19]

Kimura et al.

[11] Patent Number: 4,639,080

[45] Date of Patent: Jan. 27, 1987

[54] OPTICAL FIBERS COATED WITH MODIFIED 1,4-POLYBUTADIENES

[75] Inventors: Takao Kimura; Nobuo Inagaki, both of Ibaragi; Mitsuo Yoshihara; Fumihiko Kato, both of Osaka, all of Japan

[73] Assignees: Nippon Telegraph & Telephone Public Corporation; Nitto Electric Industrial Co., Ltd., both of Japan

[21] Appl. No.: 645,138

[22] Filed: Aug. 28, 1984

Related U.S. Application Data

[62] Division of Ser. No. 394,245, Jul. 1, 1982, abandoned.

[30] Foreign Application Priority Data

Jul. 4, 1981 [JP] Japan .................................. 56-104770

[51] Int. Cl.$^4$ ................................................. G02B 6/00
[52] U.S. Cl. .................................. 350/96.34; 525/315; 525/910; 525/911
[58] Field of Search ................. 350/94.34, 94.29, 94.3; 525/910, 911

[56] References Cited

U.S. PATENT DOCUMENTS 4,242,415  12/1980  Feltzin et al. ........................ 428/412

FOREIGN PATENT DOCUMENTS 0032331  3/1979  Japan ................................ 350/96.34
0032334  3/1979  Japan ................................ 350/96.34

*Primary Examiner*—Wilbert J. Briggs, Sr.
*Attorney, Agent, or Firm*—Sughrue, Mion, Zinn, Macpeak and Seas

[57] ABSTRACT

A coating material for optical glass fibers is disclosed. The material is comprised of 1,4-polybutadienes having functional groups or modified polybutadienes derived from the 1,4-polybutadienes having introduced therein polymerizable double bonds different from the double bonds present in the 1,4-polybutadienes.

2 Claims, No Drawings

OPTICAL FIBERS COATED WITH MODIFIED 1,4-POLYBUTADIENES

This is a division of application Ser. No. 394,245, filed July 1, 1982, now abandoned.

FIELD OF THE INVENTION

The present invention relates to a material for coating optical glass fibers used in optical transmission.

BACKGROUND OF THE INVENTION

Optical glass fibers used as a medium for optical transmission (hereinafter referred to as "optical fibers", for simplicity) generally have a diameter of 200 $\mu$m or less and are made of brittle materials so that cracks tend to occur on the surface during the manufacturing process of the fibers, production step of the fibers into a cable or storage of the cable. Any crack on the fiber surface becomes a source of stress concentration and the fibers easily break upon application of an external stress. Thus, it is extremely difficult to directly use optical fibers as a medium for optical transmission.

Many attempts have been made to form a plastic coating on the surface of optical fibers, thereby producing optical fibers maintaining the initial strength and having durability in use for a long period of time as described, for example, in T. T. Wang et al., *J. Appl. Poly. Sci.*, 23, 887-892 (1979).

Such a plastic coating comprises a first coating to maintain the initial strength, a second coating to withstand subsequent handling (e.g., assembling into a cable) which is formed by extrusion molding a thermoplastic resin such as polyamide or polyethylene and a buffer layer provided between the first and second coatings to minimize the transmission loss that may occur during the application of the second coating. The first coating and buffer layer are generally formed in the step subsequent to the drawing step of the optical fibers.

However, the thermosetting resins such as urethane and epoxy resins conventionally used to make the first coating have slow curing speed and require a long period of time to cure and dry so that the drawing rate of the optical fibers is limited, causing one of problems on mass production of the optical fibers. Another disadvantage is that these resins cannot be applied in a thick coating to provide the optical fibers having a sufficient strength. Furthermore, the buffer layer is conventionally made of RTV silicone rubber to minimize transmission loss, but this silicone rubber increases its viscosity by merely allowing to stand it at room temperature and cannot withstand drawing for a long period of time. In addition, the silicone rubber has relatively high tackiness so that dust and dirt easily adhere on its surface thereby adversely affecting at the application of the second coating.

SUMMARY OF THE INVENTION

Therefore, the object of the present invention is to provide a novel and useful coating material for optical fibers which can eliminate the defects of the conventional coating material for optical fibers, serve both as a first coating and as a buffer layer and enable the mass production of optical fibers having sufficient strength. This object can be achieved by using a coating material comprising 1,4-polybutadienes containing functional groups or modified polybutadienes derived from the 1,4-polybutadienes and having introduced therein polymerizable double bonds different from the double bonds present in the 1,4-polybutadiene.

The coating material of the present invention comprises 1,4-polybutadienes or derivatives thereof. Such a coating as excellent flexibility as compared with coatings comprising conventional thermosetting resins or other polymers such as 1,2-polybutadiene and does not require a buffer layer to be formed on the first coating. Furthermore, the 1,4-polybutadienes or derivatives thereof contain functional groups or polymerizable double bonds and, therefore, can be cured by heating, exposure to light or irradiation of electron beams. The curing rate is much faster than that of the conventional coating material so that the efficiency of coating operation, hence the mass production of optical fibers, is remarkably improved.

The flexibility of the coating comprising the material of the present invention can give an advantage with respect to strength and prevent increase of transmission loss due to microbending which can appear in the coatings of the conventional thermosetting resins, thereby enabling the production of highly reliable optical fibers. The 1,4-polybutadienes having functional groups or derivatives thereof are liquid at room temperature even though having relatively high molecular weight and can be used as a non-solvent type coating material or a coating material using smaller amount of an organic solvent, and this facilitates the formation of a thick coating which can improve the strength of the optical fibers. The non-solvent type coating materials are advantageous in the viewpoints of energy saving and pollution control and can prevent the foaming of coating and occurrence of pinholes due to the removal of solvents.

DETAILED DESCRIPTION OF THE INVENTION

The 1,4-polybutadienes containing functional groups which can be used as the coating material of the present invention contain at least two functional groups such as hydroxy group, carboxyl group, isocyanate group and epoxy group in the molecule. Preferred 1,4-polybutadienes are ones having such functional groups at both terminals of the molecule. Commercially available 1,4-polybutadienes can be used directly. If necessary, 1,4-butadienes containing a hydroxyl group may be reacted with dicarboxylic acid or diisocyanate compounds to prepare the desired 1,4-polybutadienes.

The coating material of the present invention is generally composed of at least two kinds of these 1,4-polybutadienes so that the functional groups in the individual polybutadiene react with each other to cure the coating material. Coatings having improved characteristics can be produced by adding another polyfunctional compound to the 1,4-polybutadiene mixture. In some cases, single 1,4-polybutadiene having functional groups is blended with the above-described polyfunctional compound other than 1,4-polybutadiene which reacts with the functional groups of the 1,4-polybutadiene to prepare a curable coating material.

Examples of such a curable coating material include a coating material prepared by blending a diisocyanate compound such as hexane diisocyanate, dodecane diisocyanate, diphenylmethane diisocyanate or diphenylether diisocyanate with 1,4-polybutadiene containing hydroxyl groups or a coating material prepared by blending diols such as neopentyl glycol, polyethylene glycol or polypropylene glycol; diamines such as hexamethylenediamine, diaminodiphenylmethane or diaminodiphenylether; polybasic acids such as adipic acid, sebacic acid, dodecanedicarboxylic acid, phthalic anhydride or trimellitic anhydride, and esters thereof with 1,4-polybutadiene having isocyanate groups.

When the 1,4-polybutadienes having functional groups are used as the main ingredients of the coating material of the present invention, curing reaction takes place between functional groups, and if the functional groups are very reactive with each other, a two-part coating material is employed, if desired.

Other material for the coating material of the present invention is modified polybutadienes derived from the above described 1,4-polybutadienes having functional groups. The modified polybutadienes have polymerizable double bonds introduced in the molecule different from the double bonds present in the 1,4-polybutadienes. Therefore, the modified polybutadienes can provide a coating material capable of being cured by heating, exposure to light or irradiation of electron beams due to the polymerizable double bonds introduced in the molecule.

There are many types of compounds included in the definition of the modified polybutadienes. The specific example thereof is a polycondensation product of 1,4-polybutadienes having functional groups and a polyfunctional compound having a polymerizable double bond. Representative examples of the polycondensation product are polyester condensates of 1,4-polybutadiene having hydroxyl groups and unsaturated dibasic acids such as maleic acid, fumaric acid, itaconic acid or citraconic acid, or their derivatives such as acid anhydrides thereof.

In preparing the above polyester condensates, the unsaturated dibasic acids or their derivatives and the 1,4-polybutadiene having a hydroxyl group are used in amounts such that at least 0.5 equivalent, preferably 0.7 to 2.0 equivalents of the carboxyl groups is present per the equivalent of the hydroxyl group so as to minimize unreacted 1,4-polybutadiene. If unreacted 1,4-polybutadiene remains in the case of curing the coating material utilizing the polymerizable double bond the coating characteristics after curing tend to deteriorate.

The polycondensates are not limited to the above polyester condensates and other polycondensation products such as polyurethane condensates, polyimide condensates, polyamide condensates or polyamideimide condensates can be used by selecting polyfunctional compound having polymerizable double bonds according to the functional groups in the 1,4-polybutadienes.

When the modified polybutadienes comprising such polycondensation products are used as the main ingredients for the coating material of the present invention, such coating material can be cured by heating, exposure to light or irradiation of electron beams in the presence of a suitable heat curing agent or sensitizer. The coating material may further contain compounds having polymerizable double bonds to make the handling easy.

Suitable examples of the compounds having polymerizable double bonds include acrylates, methacrylates or allyl esters. Specific examples thereof include butyltriethylene glycol acrylate, polypropylene glycol methacrylate, neopentyl glycol diacrylate, polyester diacrylate, polyethylene glycol diacrylate, polypropylene glycol diacrylate, diallyl adipate, diallyl phthalate, diethylene glycol bis(allylcarbonate) or triallyl isocyanurate. These compounds are preferably used in an amount of not more than 300 parts by weight, preferably not more than 100 parts by weight, per 100 parts by weight of the modified polybutadiene. If the amount is too large, the flexibility of the coating becomes poor.

Other examples of the modified polybutadienes are condensation products of 1,4-polybutadienes having functional groups and monofunctional compounds having a polymerizable double bond, and the products wherein the monofunctional compounds have acryl, methacryl or allyl groups are particularly preferred. The condensation products thus obtained have generally the form such that monofunctional compounds have been reacted with all functional groups of 1,4-polybutadiene having functional groups.

These condensation products are prepared by reacting 1,4-polybutadiene having hydroxyl groups with acrylic acid, methacrylic acid or halides thereof (e.g., chlorides) or esters thereof (e.g., methyl esters), reacting 1,4-polybutadiene having isocyanato groups with hydroxyalkyl esters (e.g., 2-hydroxyethyl acrylate or methacrylate) or allyl alcohols, or reacting 1,4-polybutadiene having carboxyl groups with epoxy-containing esters (e.g., glycidyl acrylate or methacrylate) or allyl alcohols.

The modified polybutadienes comprising these condensation products are more easily curable by heating, exposure to light or irradiation of electron beams as compared with the above described polycondensation products. Therefore, the above described compounds having polymerizable double bonds are not particularly required. However, such compounds may be added, if desired.

Where the condensation products obtained from 1,4-polybutadiene and the monofunctional compound are used as main ingredients for the coating material of the present invention, such coating material can be cured alone or by heating, exposure to light or irradiation of electron beams in the presence of suitable heat curing catalyst or photosensitizer. If desired, the coating material may further contain the compounds having polymerizable double bonds described above to make the handling easy. The compounds having polymerizable double bonds can be used in an amount of 300 parts by weight or less, preferably 100 parts by weight or less, per 100 parts by weight of the condensation products.

The coating material for optical fibers according to the present invention is comprised of either 1,4-polybutadienes having functional groups or modified polybutadienes derived from the 1,4-polybutadienes and having polymerizable double bonds introduced in their molecule. The coating material comprising the 1,4-polybutadiene is cured by the reaction between functional groups and the coating material comprising the modified polybutadiene is cured by thermal polymerization, photopolymerization or electron beam induced polymerization of the polymerizable double bonds.

In curing by the reaction between functional groups use of initiator is not particularly required, but in curing by polymerization, a heat curing catalyst such as benzoyl peroxide or t-butyl peroxybenzoate or a sensitizer such as acetophenone, benzophenone or benzoinisopropyl ether is used. These initiators are generally used in an amount of about 0.1 to 10 wt% based on the weight of the coating material.

The 1,4-polybutadienes having functional groups or modified polybutadienes derived therefrom according to the present invention generally have a number average molecular weight of from 300 to 10,000, preferably from 500 to 5,000.

The coating material of the present invention may contain modifier resins or other various additives. If desired, the coating material may be diluted with a suitable solvent. Modifier resins are used in an amount not greater than that of the main ingredients of the coating material, preferably not more than ¼ (weight ratio) of the main ingredient.

Suitable examples of modifier resins include epoxy resins, polyamide, polyurethane, polyether, polyamideimide, silicone resins or phenolic resins.

Suitable examples of the additives include curing accelerators such as cobalt naphthenate, zinc naphthenate, dimethylaniline or dibutyl tin dilaurate, organosilicon compounds, surfactants or the like.

The coating method of the optical fibers in the present invention comprises after the drawing step of optical fibers in the conventional manner, i.e., heating and drawing the starting rod-like or block-like material for optical fibers into optical fibers having desired diameter, applying the coating material of the present invention on the surface of the fibers and then curing the coating by heating or exposure to light (e.g., ultraviolet rays) or irradiation of electron beams. The cured product can provide a flexible first coating and the coated fibers are then subjected directly to the step of the second coating without a buffer layer.

The rod-like starting material is generally referred to as a preform for quartz fibers, and the block-like starting material is drawn into multi-component fibers by the double crucible method. The suitable diameter of optical fibers is generally 200 μm or less.

As described above, the coating material for optical fibers of the present invention comprises the specified 1,4-polybutadienes as the main ingredients. Therefore, the curing rate is faster than that of the conventional material, resulting in increasing producibility of optical fibers. Furthermore, the coating material can form a flexible coating and can also form a thick coating, thereby improving the strength and reliability of the optical fibers.

The present invention is now described in greater detail by reference to the following examples and comparative examples which are given here for illustrative purposes only and are by no means intended to limit the scope of the invention. Unless otherwise indicated, all parts are by weight.

EXAMPLE 1

120 g of 1,4-polybutadiene having hydroxyl groups at the terminals of the molecule (hydroxyl group content: 0.83 meq/g) and 4.9 g of maleic anhydride were charged into a 300 cc flask and reacted at 100°–115° C. for 5 hours to obtain a polyester having an acid value of 10 (mg KOH/g and hereinafter the same) and a viscosity of 26,500 centipoise/25° C. (solventless, measured by Brookfield viscometer, hereinafter the same).

20 Parts of neopentyl glycol diacrylate and 5 parts of benzoinisopropyl ether were dissolved in 80 parts of the polyester obtained above to prepare a coating material for optical fibers.

EXAMPLE 2

120 g of 1,4-polybutadiene having hydroxyl groups at the terminals of the molecule (hydroxyl group content: 0.83 meq/g) and 3.43 g of maleic anhydride were charged into a 300 cc flask and reacted at 100°–125° C. for 5 hours to obtain a polyester having an acid value of 1 and a viscosity of 19,000 centipoise/25° C.

10 Parts of polyester diacrylate (a diester of phthalic acid and 1,5-pentanediol, the both terminals of which being acrylic group) and 1 part of benzoylperoxide were dissolved in 90 parts of the polyester obtained above to prepare a coating material for optical fibers.

EXAMPLE 3

120 g of 1,4-polybutadiene having hydroxyl groups at the terminals of the molecule (hydroxyl group content: 0.83 meq/g) and 9.8 g of maleic anhydride were charged into a 300 cc flask and reacted at 100°–110° C. for 3 hours to obtain a polyester having an acid value of 43 and a viscosity of 15,500 centipoise/25° C.

30 Parts of polypropylene glycol methacrylate (a number average molecular weight: 370) and 1 part of benzoylperoxide were dissolved in 70 parts of the polyester obtained above to prepare a coating material for optical fibers.

EXAMPLE 4

20 Parts of diethylene glycol bis(allylcarbonate) and 1 part of benzoylperoxide were dissolved in 80 parts of the polyester obtained in Example 1 to prepare a coating material for optical fibers.

COMPARATIVE EXAMPLE 1

5 Parts of 2-ethyl-4-methyl imidazole was dissolved in 100 parts of an epoxy resin ("Epon-828", a product of Shell Oil Company) to prepare a coating material for optical fibers.

The characteristics of each coating material prepared in Examples 1 to 4 and Comparative Example 1 were examined. The results obtained are shown in Table 1 below.

TABLE 1

|  | Example No. | | | | Comparative |
| --- | --- | --- | --- | --- | --- |
|  | 1 | 2 | 3 | 4 | Example 1 |
| Viscosity (centipoise/25° C.) | 8,600 | 1,700 | 3,400 | 5,700 | 15,000 |
| Gelling Time (sec/150° C.) | — | 13 | 30 | 45 | 59 |
| Shore Hardness (Scale A) | 45 | 48 | 35 | 40 | 100 or more |

Shore hardness (Scale A) in Table 1 was measured as follows.

Examples 2–4 and Comparative Example 1: Each coating material was heat cured at 150° C. for 15 minutes to prepare a 2 mm thick plate and the plate was measured.

Example 1: A 100 μm thick sheet was prepared by exposing the coating material on a belt conveyor (running speed: 50 m/min) before two parallel high-pressure mercury lamps (input: 120 w/cm, lamp output: 5 kw) at a distance of 15 cm and was measured.

EXAMPLE 5

A coating material for optical fibers was prepared from a mixture of 100 parts of 1,4-polybutadiene having isocyanato groups in the molecule (1,4-polybutadiene/tolylene diisocyanate adduct, isocyanato group content: 9 wt%), 257 parts of 1,4-polybutadiene having hydroxyl groups at the terminals of the molecule (hydroxyl group content: 0.83 meq/g) and 0.05 part of dibutyl tin dilaurate.

COMPARATIVE EXAMPLE 2

A coating material for optical fibers was prepared from a mixture of 100 parts of 1,2-polybutadiene having isocyanato groups in the molecule (1,2-polybutadiene/tolylene diisocyanate adduct, isocyanato group content: 8 wt%), 200 parts of 1,2-polybutadiene having hydroxyl groups at the terminals of the molecule (hydroxyl group content: 0.95 meq/g) and 0.05 part of dibutyl tin dilaurate.

The characteristics of the coating materials of Example 5 and Comparative Example 2 were measured. The results obtained are shown in Table 2 below.

TABLE 2

|  | Example 5 | Comparative Example 2 |
| --- | --- | --- |
| Viscosity (cps/25° C.) | 5,100 | 32,000 |
| Gelling Time (sec/150° C.) | 2 | 2 |
| Shore Hardness (Scale A) | 24 | 100 or more |

EXAMPLE 6

12 g of 1,4-polybutadiene having hydroxyl groups at the terminals of the molecule (hydroxyl group content: 0.83 meq/g), 72 g of acrylic acid, 50 ml of benzene, 1.7 g of p-toluenesulfonic acid and 70 mg of hydroquinone were charged into a 300 cc four-necked flask equipped with a stirrer, thermometer and a fractionating column and reacted at 90° C. for 7 hours while removing water produced in the reaction. The reaction mixture was washed with water to remove the unreacted acrylic acid, followed by removing benzene under reduced pressure to obtain a yellow transparent viscous liquid having acryl groups at the terminals of the molecule.

5 Parts of benzoinisopropyl ether was mixed with 100 parts of the liquid to obtain a coating material for optical fibers. The material had a viscosity of 55 poise/30° C. and a Shore hardness (Scale A) of 45.

EXAMPLE 7

12 g of 1,4-polybutadiene having hydroxyl groups at the terminals of the molecule (hydroxyl group content: 0.83 meq/g), 5 g of succinic anhydride and 50 ml of benzene were charged into a flask as used in Example 6 and reacted at 90° C. for 3 hours. To the reaction mixture, 71 g of glycidyl methacrylate, 0.5 g of dimethyl benzylamine and 70 mg of hydroquinone were added and the reaction was continued at 90° C. for 5 more hours until the acid value of the contents was 0.5. Then, the unreacted glycidyl methacrylate and benzene were removed under reduced pressure to obtain a yellow transparent viscous liquid having methacryl groups at the terminal of the molecule.

5 Parts of benzoinisopropyl ether was mixed with 100 parts of the liquid to obtain a coating material for optical fibers. The coating material had a viscosity of 63 poise/30° C. and a Shore hardness (Scale A) of 40.

EXAMPLE 8

120 g of 1,4-polybutadiene having hydroxyl groups at the terminals of the molecule (hydroxyl group content: 0.83 meq/g) was charged into a flask as used in Example 6 and 17.4 g of tolylene diisocyanate was added dropwise at 30°–40° C. over 1 hour. Thereafter, 11.6 g of 2-hydroxyethyl acrylate was further added dropwise at 30°–40° C. over 1 hour. A yellow transparent viscous liquid having acryl groups at the terminal of the molecule was obtained.

5 Parts of benzoinisopropyl ether was mixed with 100 parts of the liquid to prepare a coating material for optical fiber. The coating material had a viscosity of 400 poise/60° C. and a Shore hardness (Scale A) of 52.

COMPARATIVE EXAMPLE 3

100 Parts of a bisphenol type epoxy acrylate was mixed with 5 parts of benzoinisopropyl ether to obtain a coating material for optical fibers. The coating material had a viscosity of 320 poise/50° C. and a Shore hardness (Scale A) of 100 or more.

Optical fibers were coated with each coating sample of Examples 2, 5 and 6 and Comparative Examples 1 to 3 and the characteristics of the coated optical fibers were tested as shown in the following Test Examples 1–6.

TEST EXAMPLE 1

Optical fibers drawn to a diameter of 125 μm at a rate of 30 m/min were immediately coated with the coating material of Example 6 and the coating was cured by irradiation of ultraviolet light (two ultraviolet lamps, lamp output: 2 kw). The coated fibers had an outer diameter of about 250 μm and their surface was uniform. Further, the coated fibers had a breaking strength of 6.2 kg (the average value of 10 m long 20 fibers) and no increase in transmission loss was observed until the temperature of −40° C.

TEST EXAMPLE 2

Coated optical fibers were prepared in the same procedure as in Test Example 1 except that the coating material of Example 6 was replaced by the coating material of Comparative Example 3. The outer diameter of the coated fibers was not uniform and varied between about 215 and 249 μm. The coated fibers had a breaking strength of 6.0 kg and a significant increase in transmission loss was observed at −40° C. or below.

TEST EXAMPLE 3

Optical fibers drawn to a diameter of 125 μm at a rate of 70 m/min were coated with the coating material of Example 5 and the coating was cured in an electric furnace at 340° C. The coated fibers had an outer diameter of about 225 μm and a breaking strength of 6.2 kg. No increase in transmission loss was observed until the temperature of −40° C.

TEST EXAMPLE 4

Coated optical fibers were prepared in the same procedure as in Test Example 1 except that the coating material of Example 6 was replaced by the coating material of Comparative Example 2. The outer diameter of the coated fibers was not uniform and varied between about 169 and 335 μm. The coated fibers had a breaking strength of 4.7 kg and a significant increase in transmission loss was observed at −40° C. or below.

TEST EXAMPLE 5

Optical fibers drawn to a diameter of 125 μm at a rate of 20 m/min were coated with the coating material of Example 2 and cured in an electric furnace (450° C., 1 m long). The coated fibers had an outer diameter of about 230 μm and their surface was uniform. The coated fibers had a breaking strength of 6.3 kg as an average value of 10 m long 20 fibers and no increase in transmission loss was observed until the temperature of −40° C.

TEST EXAMPLE 6

Coated optical fibers were prepared in the same procedure as in Test Example 5 except that the coating material of Example 2 was replaced by the coating material of Comparative Example 1 and the coating was cured in an electric furnace at 650° C. The outer diameter of the coated fibers was not uniform and varied between about 150 and 310 μm. A significant increase in transmission loss was observed at −20° C. or lower.

As described above, the coating material for optical fibers of the present invention has fast curing rate so that coating can be performed rapidly with good adhesiveness in the drawing step of optical fibers. In addition, the cured coating is very flexible, thereby providing coated optical fibers having good transmission characteristics.

While the invention has been described in detail and with reference to specific embodiments thereof, it will be apparent to one skilled in the art that various changes and modifications can be made therein without departing from the spirit and scope thereof.

What is claimed is:

1. An optical glass fiber coated with a cured product formed from a coating material comprising 1,4-polybutadienes having functional groups or modified polybutadienes derived from the 1,4-polybutadienes and having introduced therein polymerizable double bonds different from the double bonds present in the 1,4-polybutadienes, further including a compound having polymerizable double bonds, and wherein the modified polybutadienes are polycondensation products of the 1,4-polybutadienes having functional groups and polyfunctional compounds having polymerizable double bonds.

2. An optical glass fiber of claim 1, wherein the compound having polymerizable double bonds is a member selected from the group consisting of acrylate esters, methacrylate esters and allyl esters.

* * * * *